(12) United States Patent
Pickman

(10) Patent No.: US 10,661,475 B2
(45) Date of Patent: May 26, 2020

(54) PANEL INSERT FOR CONCRETE FOUNDATION WALLS

(71) Applicant: Jacob Pickman, Nantucket, MA (US)

(72) Inventor: Jacob Pickman, Nantucket, MA (US)

( * ) Notice: Subject to any disclaimer, the term of this patent is extended or adjusted under 35 U.S.C. 154(b) by 0 days.

(21) Appl. No.: 16/379,282

(22) Filed: Apr. 9, 2019

(65) Prior Publication Data

US 2020/0023549 A1 Jan. 23, 2020

Related U.S. Application Data

(60) Provisional application No. 62/700,516, filed on Jul. 19, 2018.

(51) Int. Cl.
*B28B 23/02* (2006.01)
*B28B 7/16* (2006.01)
*E04B 1/41* (2006.01)
*B28B 23/00* (2006.01)

(52) U.S. Cl.
CPC .............. *B28B 7/16* (2013.01); *B28B 23/005* (2013.01); *E04B 1/41* (2013.01); *E04B 2103/02* (2013.01)

(58) Field of Classification Search
CPC ......... B28B 7/16; B28B 23/005; B28B 7/164; B28B 7/186; E04B 1/41; E04B 2103/02; E04C 1/397; H02G 3/22; E02D 27/00
See application file for complete search history.

(56) References Cited

U.S. PATENT DOCUMENTS

| | | | |
|---|---|---|---|
| 4,365,780 A | 12/1982 | Williams | |
| 5,174,910 A | 12/1992 | Pita | |
| 5,806,829 A * | 9/1998 | Banks | B28B 7/18 249/11 |
| 5,951,924 A * | 9/1999 | Malecha | B28B 7/28 264/275 |
| 6,223,487 B1 | 5/2001 | Dinkel | |
| 6,550,834 B2 | 4/2003 | Fromelius | |
| 9,169,662 B1 | 10/2015 | Kim | |
| 9,935,444 B1 * | 4/2018 | Gardner | H02G 3/22 |
| 2004/0231880 A1 * | 11/2004 | Beele | A62C 3/16 174/668 |
| 2005/0179214 A1 * | 8/2005 | Beele | F16L 5/04 277/628 |
| 2016/0005516 A1 * | 1/2016 | Okuhara | H02G 3/22 174/650 |
| 2017/0194080 A1 * | 7/2017 | Nara | H02G 3/22 |
| 2017/0353023 A1 * | 12/2017 | Rehder | F16L 5/027 |

FOREIGN PATENT DOCUMENTS

JP 2009/035982 A 2/2009

\* cited by examiner

*Primary Examiner* — Patrick J Maestri
(74) *Attorney, Agent, or Firm* — Preti Flaherty Beliveau & Pachios LLP

(57) ABSTRACT

A panel insert is provided which is installed in a concrete wall form and secured at an intended location such that when the concrete is poured into the form and cured, the panel remains in place and through which holes or openings can be readily formed after the concrete wall has been constructed. The panel insert comprises a box or enclosure made of a suitable plastic or other material and having an interior filled with a structural and thermally insulative foam or other material. At least one gasketed flange is provided around the periphery of the enclosure which forms a watertight seal between the concrete and panel.

16 Claims, 10 Drawing Sheets

PANEL INSERT FOR CONCRETE FOUNDATION WALLS

STATEMENT REGARDING FEDERALLY SPONSORED RESEARCH OR DEVELOPMENT n/a

BACKGROUND OF THE INVENTION

In the construction of concrete walls for building foundations and other structures, there is often a need for holes or openings through the concrete wall through which pipes, cables, wires and other items can extend from one side of the wall to the other. In one traditional practice, a hole is drilled through the wall after the concrete wall has been erected. This is a time-consuming process and an added expense by reason of the tooling needed to drill the hole through concrete and the cost of personnel associated with the drilling process. Another known practice is the use of sleeves provided in a concrete form at locations at which holes are intended and around which the poured concrete is formed to retain the sleeve in place after the concrete has cured. While such sleeves provide an opening through a concrete wall for passage of pipes, cables and the like, such sleeves often provide a leakage path between the outer sleeve wall and confronting concrete which allows water to infiltrate from one side of the wall to the other.

Other techniques for creating holes or openings in concrete are shown in U.S. Pat. Nos. 5,174,910, 6,550,834, 4,365,780, 5,951,924 and 5,806,829 and in Japanese Publication 2009-035982.

BRIEF SUMMARY OF THE INVENTION

In accordance with the present invention, a concrete wall form panel insert is provided which is easily installed in a form prior to pouring of the concrete and which remains in place after pouring and curing of the concrete in sealing bonded engagement with the surrounding concrete. A watertight seal is provided between the concrete and the panel insert.

More particularly, the present invention provides a panel insert which is installed in a concrete wall form and secured at an intended location such that when the concrete is poured into the form and cured, the panel remains in place and through which holes or openings can be readily formed after the concrete wall has been constructed. The panel can be retained in an intended position in the form by surrounding rebars or by retention elements and contains one or more gasketed flanges around the periphery of the panel which sealingly bond to the concrete to provide a watertight seal between the concrete and the panel.

The panel comprises a box or enclosure which typically is of square or rectangular shape and is formed of a suitable plastic material such as PVC. The interior of the enclosure is filled with a closed-cell structural and thermally insulative foam or other structural and insulative filler material, such as cork, which can be readily drilled. At least one flange is provided around the periphery of the enclosure. The flange can be fabricated of the same material as the enclosure and preferably is integrally molded with the enclosure to form a one piece unitary structure. At least one gasket is provided on the front and rear faces of the one or more flanges, the gasket being formed of a resilient material such as a rubber compound or sealing material, such as Bentonite.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
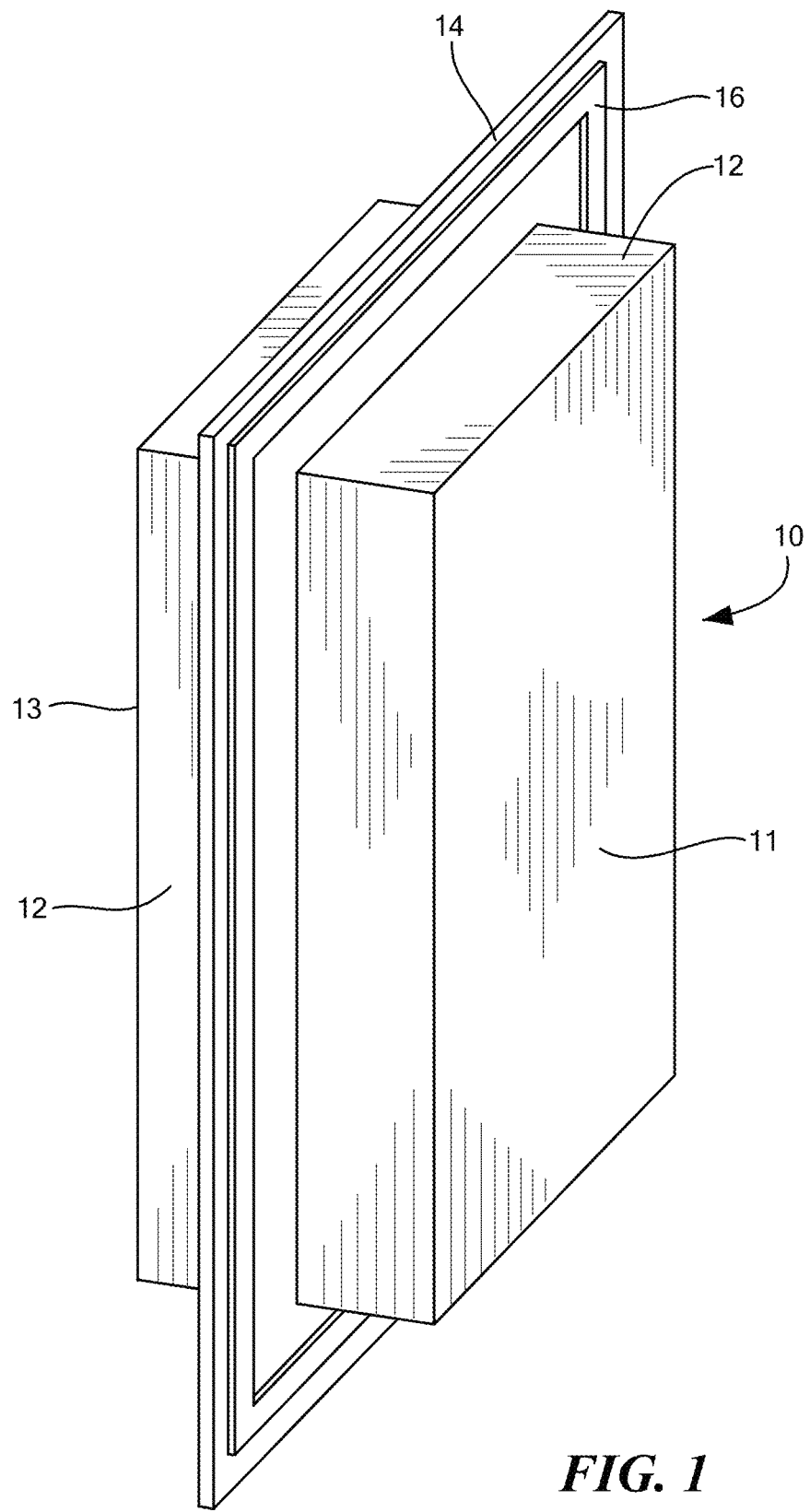
FIG. 1 is a pictorial view of an embodiment of a panel insert in accordance with the invention.
Figure 2:
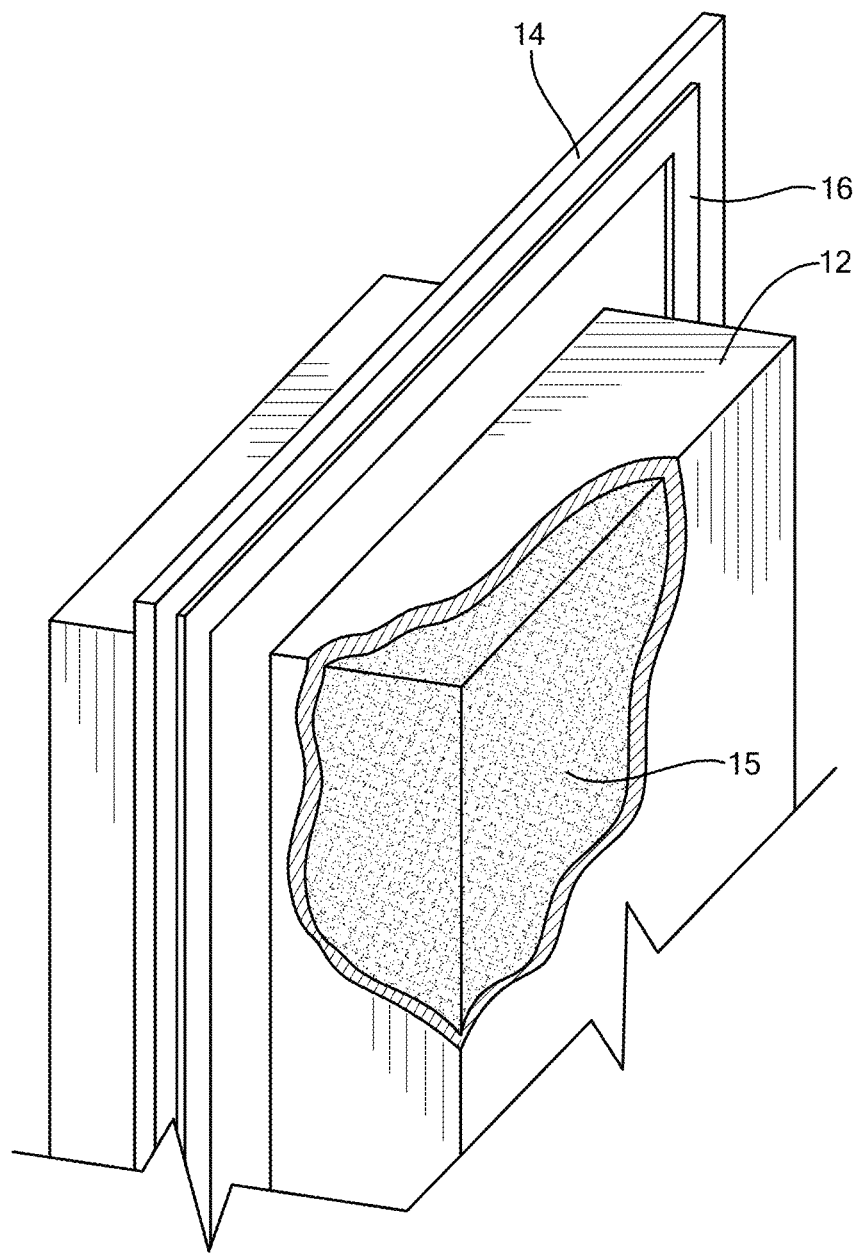
FIG. 2 is a cutaway pictorial view of the embodiment of FIG. 1 showing the foam interior of the enclosure.

One embodiment of a panel insert according to the invention is illustrated in FIGS. 1 and 2 and comprises a box or enclosure 10 which is formed of PVC or other suitable plastic or other material and having an integrally formed flange 14 around the periphery of the enclosure and outwardly extending from the respective walls 12 thereof. The enclosure has a front or first face or surface 11, a rear or second face or surface 13 opposite the first face, and top, bottom and side walls 12 which define an interior space. The interior of the enclosure contains a closed-cell structural and thermally insulative foam material, such as polyurethane foam, or other structural and insulative filler material which completely fills the interior volume of the enclosure. One or more gaskets 16 are provided on front and rear faces of the flange 14. The gaskets are of a resilient material such as rubber, a rubber compound or sealing material such as Bentonite Waterstop which can form a watertight seal with the concrete poured around the enclosure, as further described below.

The enclosure and flange can be integrally molded out of plastic to produce a unitary one-piece structure. The interior of the enclosure is a closed-cell foam 15 which has structural and thermal insulating properties. One typical foam material is spray polyurethane foam (SPF), which can be introduced into the interior of the enclosure such as via one or more fill holes provided in one or more walls of the enclosure. In another aspect, the enclosure can be molded around a suitably shaped and sized foam block.

In another fabrication process, the box is molded or otherwise formed in two or more sections. After placement of the foam interior, the sections are glued or otherwise bonded together to complete the enclosure.

In another embodiment, the flange can be separately fabricated in one or more pieces and then bonded to the confronting walls of the enclosure.

Figure 3:
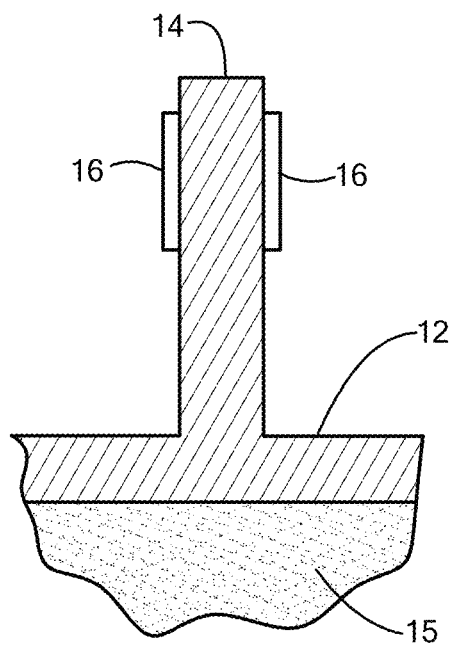
FIG. 3 is a partial view showing gaskets bonded to respective faces of a flange by an adhesive.
Figure 4:
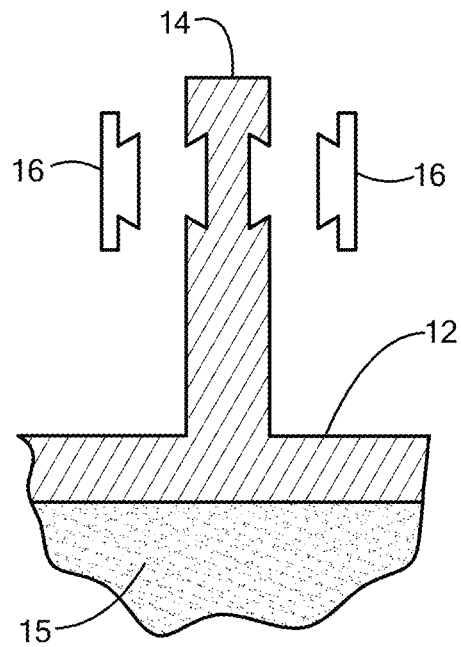
FIG. 4 is a partial exploded view showing a flange having grooves for retaining respective gaskets.

Each gasket can be applied to the confronting surface of a respective flange by a suitable adhesive, as illustrated in FIG. 3. Alternatively, each gasket can be retained in a groove provided around the perimeter of the associated flange face such as shown in FIG. 4. When inserted in a groove, the gasket may be retained mechanically such as by interference fit in the groove, or by the shape of the groove or by retention elements on the groove or gasket. As an alternative, the gasket can be retained in the groove by a suitable adhesive. The gasket may alternatively be insert molded with the flange during fabrication.

The box is typically of rectangular shape and is of a depth front to back of a size to fit within standard foundation forms which are typically 8 inches or 10 inches in depth but which can be of any size. The box can be of any size to accommodate the intended number and size of holes to be later drilled through the box. One typical size is a length of about 5 feet, a width of about 2 feet and a depth of 8 or 10 inches to fit a standard foundation form. The depth can be of another size if a non-standard foundation form is employed. The thickness of the box walls can be, for example, about one-half inch.

The flanges are of sufficient size to secure the box in the concrete when it is cured. As an example, the flange can extend outward by about 3 inches and have a thickness, for example, of about ¾ inch. These dimensions are exemplary and not intended to be limiting. The flange size will accommodate the panel size, given standardized engineering loads.

Figure 5:
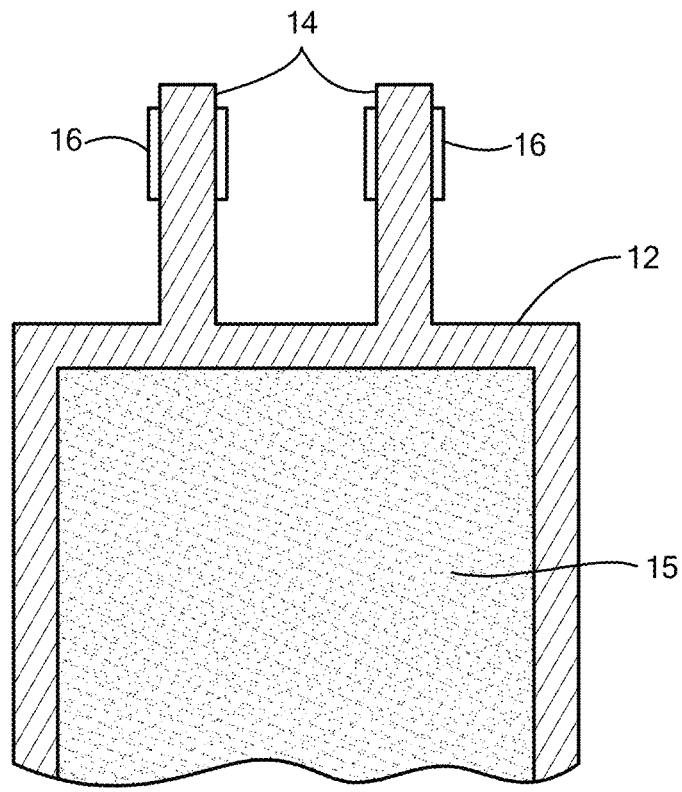
FIG. 5 is a partial side view showing two flanges in spaced position on the enclosure.

The embodiment illustrated has a single flange around the perimeter of the box. Alternative embodiments can have two or more flanges, and each flange can have one or more gaskets around the perimeter of the respective flange faces. FIG. 5 illustrates a box having two spaced flanges 14.

Figure 6:
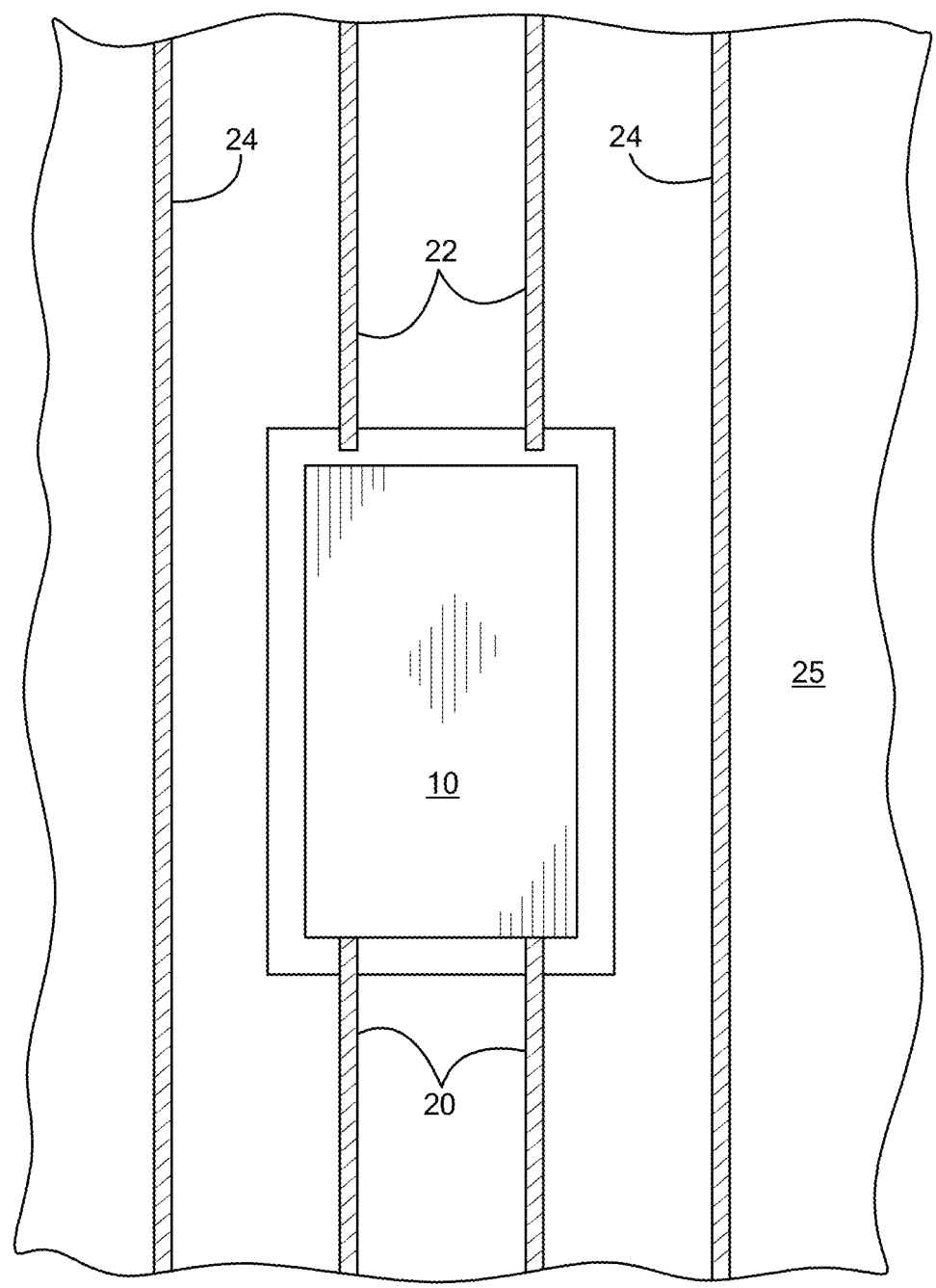
FIG. 6 is a diagrammatic view showing a panel insert according to the invention in position in a concrete wall form.

The panel can be placed anywhere in the concrete or foundation form prior to pouring the concrete, and more than one panel can be provided to suit particular installation requirements. The panel can be retained in position in the form by a variety of manners. In one embodiment, referring to FIG. 6, the panel 10 is resting on rebars 20 located below the panel. Rebars 22 above the panel extend down to engagement or near engagement with the confronting top wall of the panel. Rebars 24 could extend along the side walls of the panel to maintain the lateral or horizontal position of the panel in the form prior to pouring of the concrete into form 25. The form is usually made of wood as is well known.

The panel can alternatively be retained in position in the form by other means such as clips or tabs that can be stapled or otherwise affixed to the foundation form. Such clips or tabs can be integrally formed with the panel or affixed thereto by suitable fasteners or adhesive. These tabs are sufficiently thin to break upon removal of the form or have thinned portions which break upon form removal. Nailing cleats or other fasteners may also be employed to retain the panel in position in the foundation form.

Figure 7A:
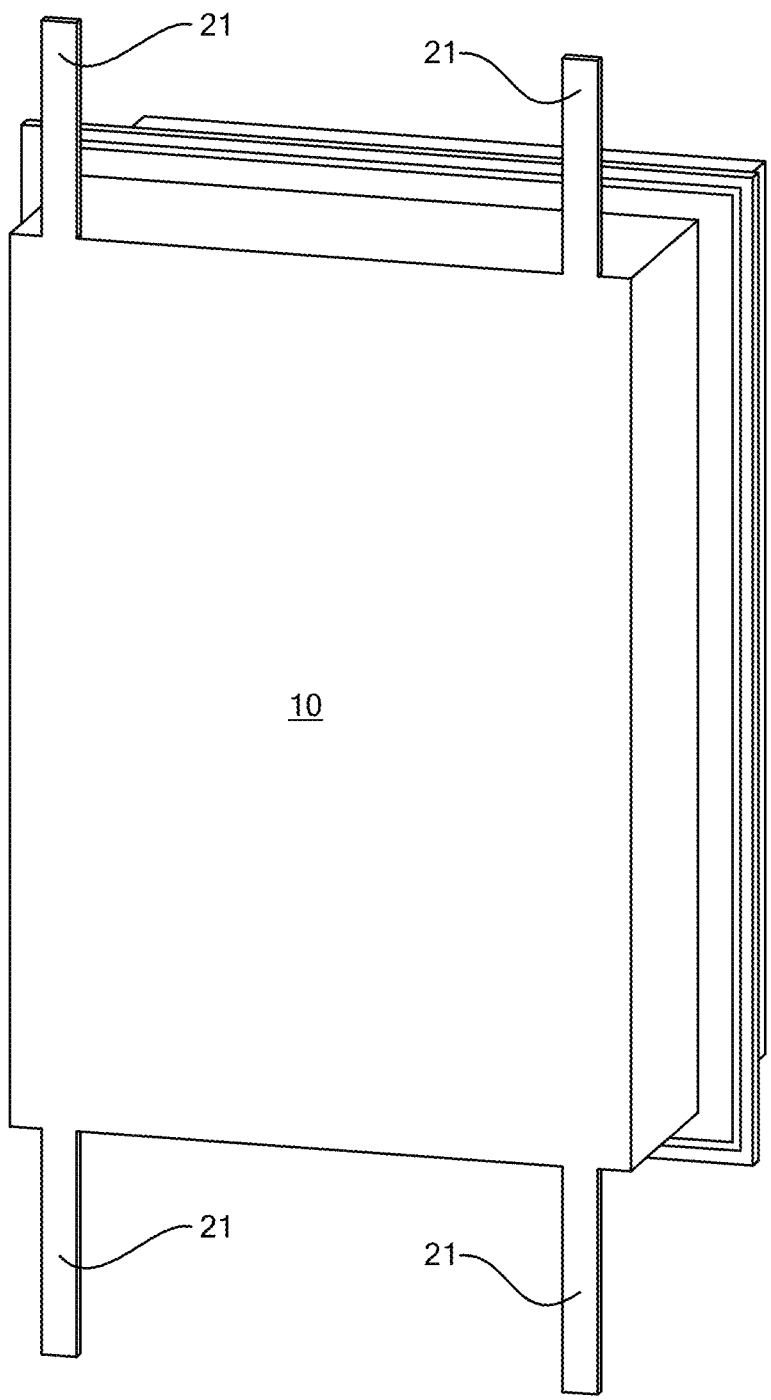
FIG. 7A is a pictorial view of an embodiment having breakaway installation tabs.

An embodiment is shown in FIG. 7A in which tabs 21 are provided near each corner of one face of the enclosure 10, and which function during installation of the panel in the concrete form to retain the panel in intended position before the concrete is poured into the form. These installation tabs are typically relatively long and thin and are stapled or otherwise fastened to the confronting form. During removal of the form, once the concrete has set, the tabs detach, leaving the panel in place. In a typical implementation, the tabs are each about 1/16 inch thick, 1.5 inches wide and 8 inches long. The tabs are preferably the same material as the panel and are integrally formed with the panel. The number and position of the tabs can vary to suit the size and configuration of a particular enclosure.

Figure 7B:
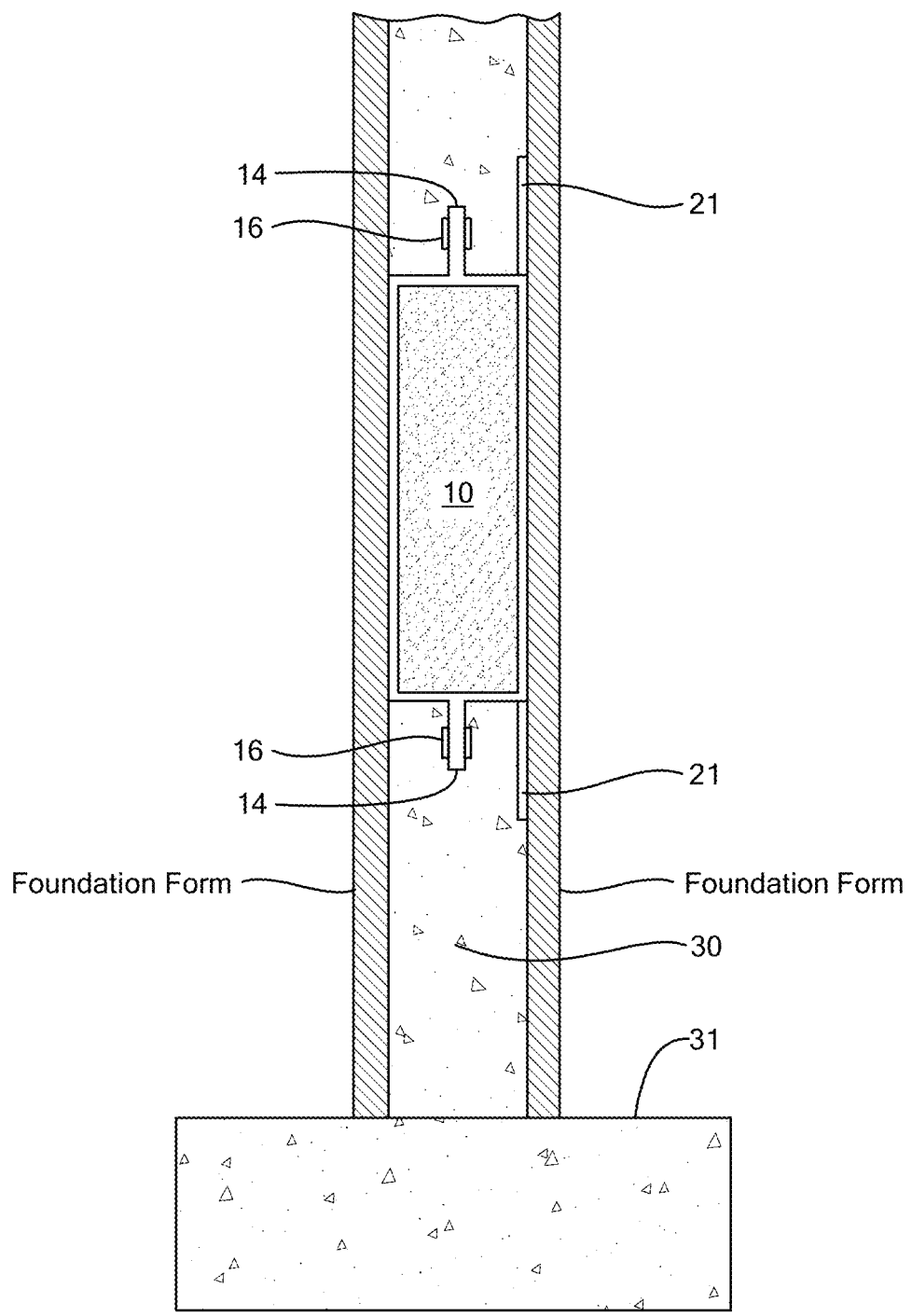
FIG. 7B is a cutaway elevation view of a panel in position in a concrete wall.
Figure 8:
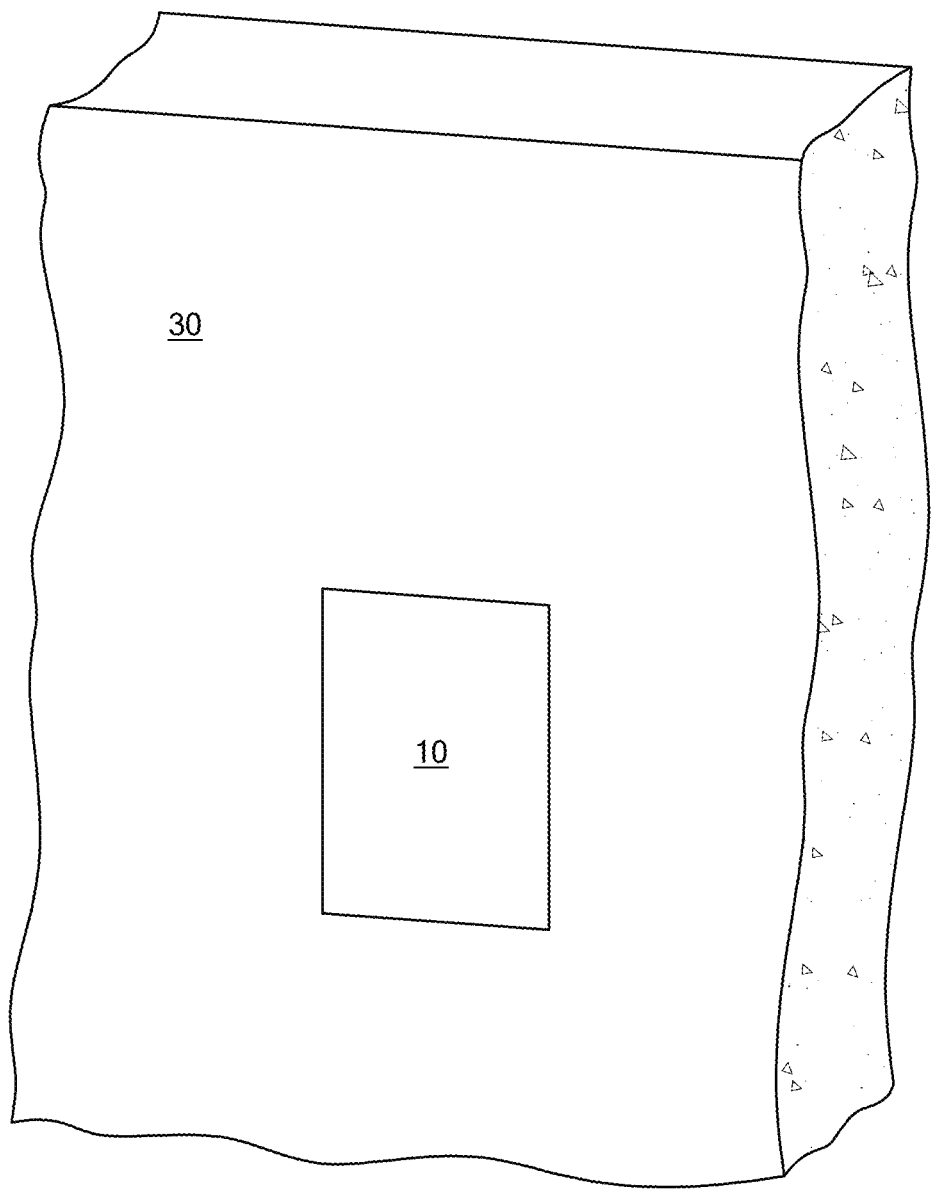
FIG. 8 is a cutaway pictorial view of a portion of a concrete wall after curing and with a panel insert in position.
Figure 9:
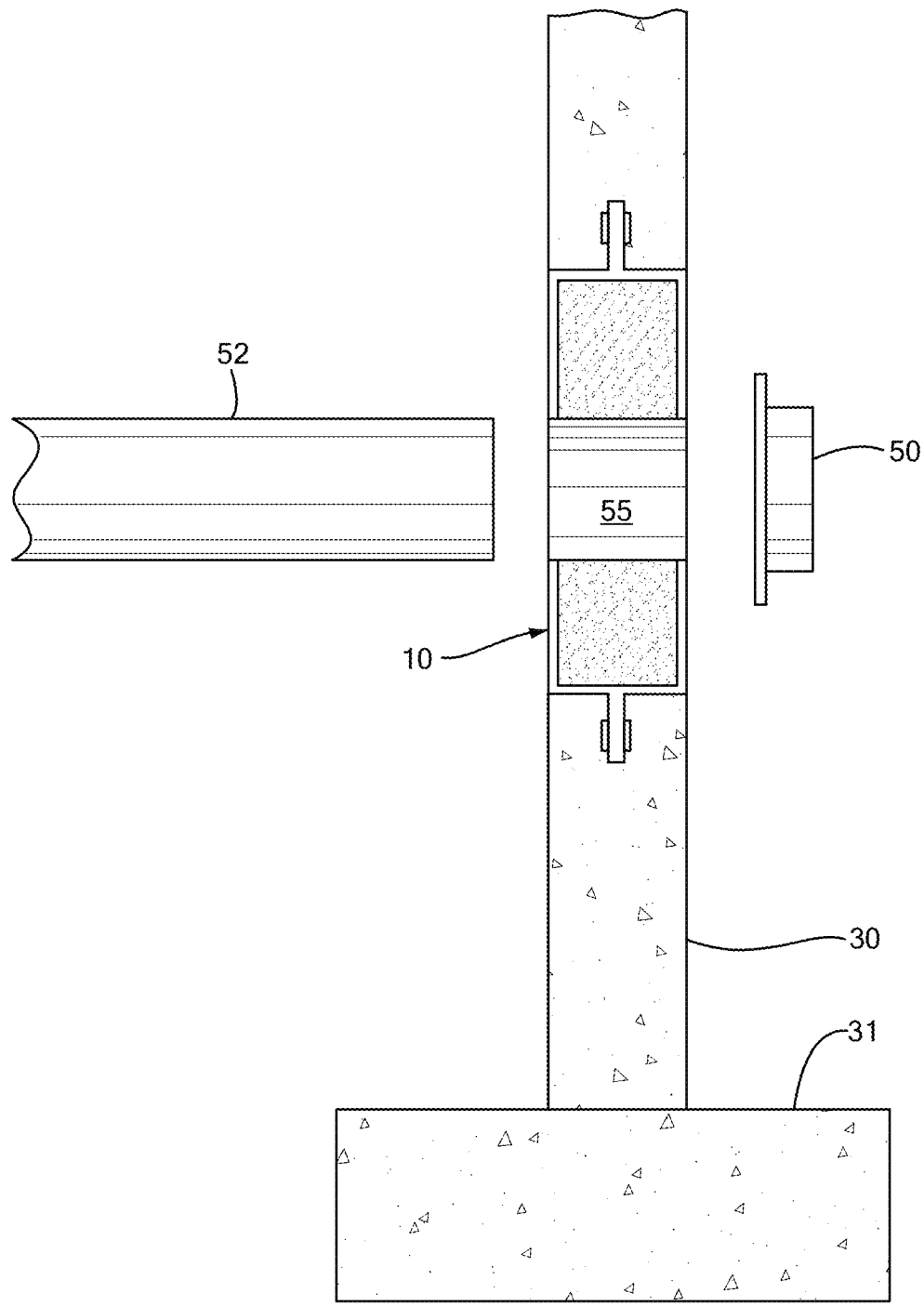
FIG. 9 is a cutaway elevation view of a PVC pipe being installed through a hole in the panel.
Figure 10:
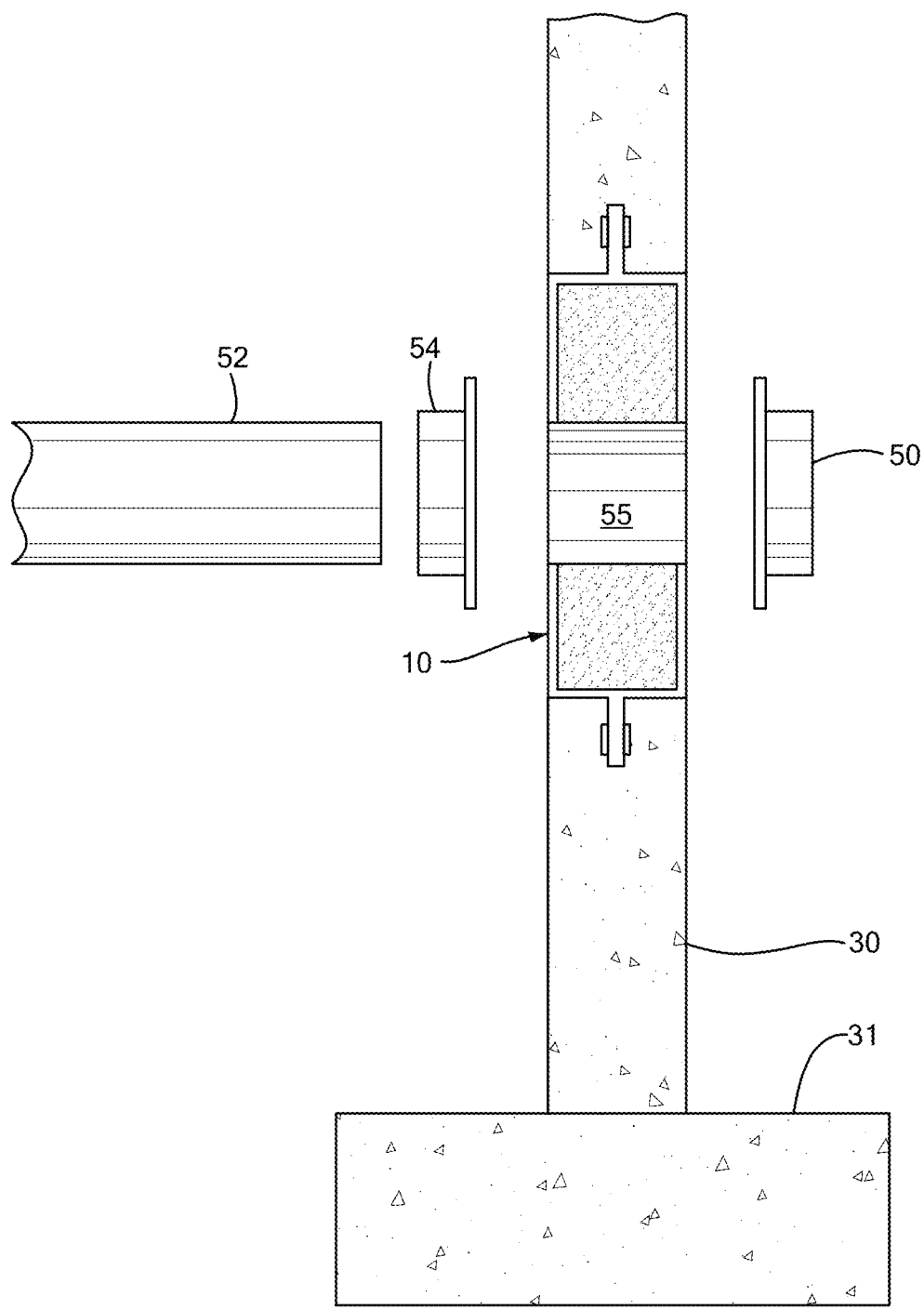
FIG. 10 is a cutaway elevation view similar to FIG. 9 and having two mounting flanges.

After the panel or panels are positioned at intended locations in the form, concrete can be poured into the form in usual manner. The concrete flows around each panel and after curing of the concrete, the concrete wall with panel insert appears as in FIG. 7B with the front and rear faces of the box substantially flush with the respective front and rear surfaces of the concrete wall 30. As illustrated in FIGS. 7B, 9 and 10, the concrete wall usually sits on a foundation footing 31, as is known. FIG. 8 shows the panel wall flush with the concrete wall, after removal of the form. After curing of the concrete which had been poured around the enclosure and flange, the panel is in watertight sealing engagement with the surrounding concrete such that substantially no water seepage occurs at the panel location from one side of the concrete wall to the other.

One or more holes can be readily drilled through the foam and front and rear walls of the box. A standard PVC pipe can be inserted through the drilled hole and cemented to the box face with traditional plumbers' fittings, primer and cement, thereby to form a watertight seal between the pipe and the box. FIG. 9 illustrates a PVC pipe 52 to be installed in a drilled hole 55 through the panel. A mounting flange 50 is attached to an exterior wall of the panel after a hole is cored or drilled through the panel. The flange 50 is affixed to the panel wall typically using a standard PVC primer and cement. Once the flange is attached to the panel wall, a standard PVC pipe 52 can be inserted through the hole into the flange and secured in the flange using PVC primer and cement. A second mounting flange 54 may be affixed to the other wall of the panel if desired, as shown in FIG. 10. Other mounting arrangements can be employed to accommodate various pipes, conduits and other items to be passed through the concrete wall as may be desired for particular installation purposes.

Figure 11:
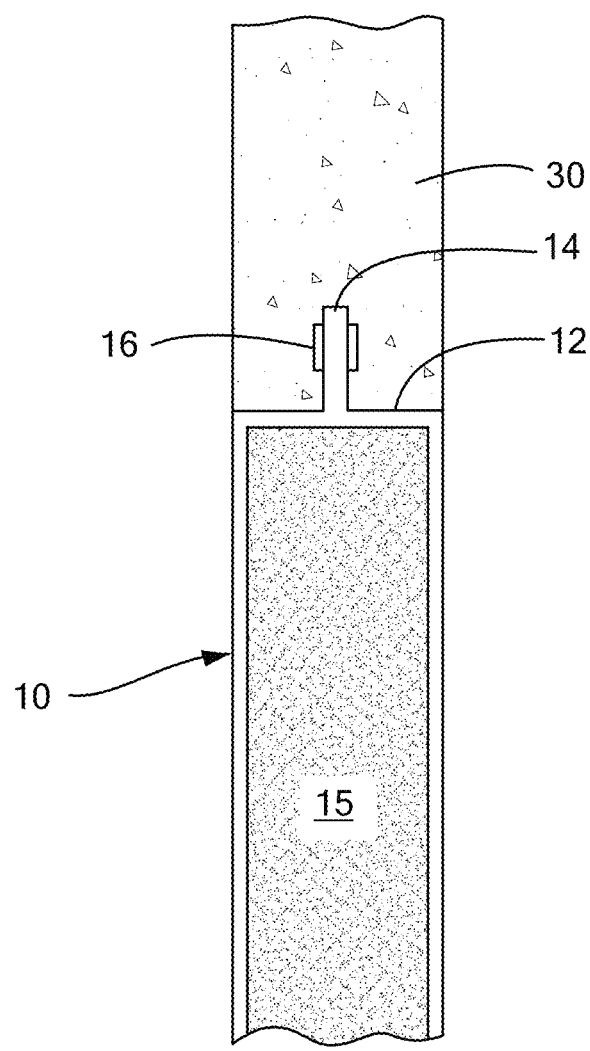
FIG. 11 is a partial cross-sectional view of a panel and flange secured in a surrounding concrete wall.

FIG. 11 shows the panel and flange secured in the surrounding concrete wall. The flange 14 and gasket 16 surrounding the enclosure 10 are embedded within the concrete wall 30 and provide a watertight seal between the panel and concrete.

It will be appreciated that this multi-use invention is not limited to the specific materials set forth in the exemplary embodiments shown and described herein or to any specific shapes, dimensions or fabrication details. As an example, the enclosure could be of circular configuration having a circular flange outwardly extending from a peripheral surface of the round enclosure. In other implementations, the enclosure could be made of metal coated to resist rust and corrosion, or the enclosure and filled interior could be replaced by a single structural material. Accordingly, the invention is intended to cover the full scope and spirit of the appended claims.

What is claimed is:

1. A panel insert for a concrete wall form for use in creating passages through a concrete wall which has been poured and cured in the form, the panel insert comprising:
    an enclosure having a first surface, a second surface opposite the first surface, and top, bottom and side surfaces, and defining an interior space;
    at least one flange having front and rear faces and outwardly extending from the top, bottom and side surfaces of the enclosure;

a structural and thermally insulating filler material filling the interior space of the enclosure;

the distance between the first and second surfaces of the enclosure being sized to allow the enclosure to fit into a concrete form with the front and rear surfaces in contact with respective confronting interior surfaces of the concrete form;

whereby the enclosure can be sealingly embedded in concrete poured and cured in the form at a position at which holes can be drilled through the first and second surfaces of the enclosure and the filler material to provide one or more passages through the concrete wall.

2. The panel insert of claim 1 wherein the enclosure is formed of a plastic material.

3. The panel insert of claim 2 wherein the plastic material is PVC.

4. The panel insert of claim 1 wherein the at least one flange is integrally formed with the enclosure.

5. The panel insert of claim 1 wherein the at least one flange is bonded to the enclosure.

6. The panel insert of claim 1 wherein the at least one flange comprises multiple flanges each outwardly extending from the top, bottom and side surfaces of the enclosure.

7. The panel insert of claim 1 wherein the at least one flange has a gasket affixed on respective front and rear faces of the flange.

8. The panel insert of claim 1 wherein the enclosure and at least one flange are integrally molded to form a unitary one-piece structure.

9. The panel insert of claim 1 wherein the filler material is a structural and thermally insulative foam material.

10. The panel insert of claim 1 wherein the filler material is placed in the interior space of the enclosure after the enclosure is formed.

11. The panel insert of claim 1 wherein the enclosure is formed around the filler material.

12. The panel insert of claim 1 wherein the filler material is a closed cell structural foam.

13. The panel insert of claim 12 wherein the foam is polyurethane foam.

14. The panel insert of claim 7 wherein the front and rear faces of the at least one flange each have a groove to retain the gasket.

15. The panel insert of claim 7 wherein the gasket is bonded to respective front and rear faces of the at least one flange.

16. The panel insert of claim 1 having a plurality of tabs affixed to the enclosure and operative to detach upon removal of the form after curing of the concrete.

* * * * *